US007120363B2

(12) United States Patent
Andreu-von Euw et al.

(10) Patent No.: US 7,120,363 B2
(45) Date of Patent: Oct. 10, 2006

(54) METHOD AND APPARATUS FOR MAINTAINING OPTICAL ALIGNMENT FOR FREE-SPACE OPTICAL COMMUNICATION

(75) Inventors: Christian Andreu-von Euw, San Diego, CA (US); Brian W. Neff, Solano Beach, CA (US); Cathal Oscolai, Encinitas, CA (US); Olaf Müller, Dresden (DE)

(73) Assignee: LightPointe Communications, Inc., San Diego, CA (US)

( * ) Notice: Subject to any disclaimer, the term of this patent is extended or adjusted under 35 U.S.C. 154(b) by 148 days.

(21) Appl. No.: 10/326,852

(22) Filed: Dec. 20, 2002

(65) Prior Publication Data

US 2004/0120719 A1  Jun. 24, 2004

(51) Int. Cl.
   *H04B 10/00*  (2006.01)
(52) U.S. Cl. .................. 398/129; 398/118; 398/131
(58) Field of Classification Search ............... 398/118, 398/128–130, 131, 120–123
   See application file for complete search history.

(56) References Cited

U.S. PATENT DOCUMENTS

| | | | |
|---|---|---|---|
| 5,268,978 A | 12/1993 | Po et al. | |
| 5,475,520 A | 12/1995 | Wissinger | |
| 5,592,320 A | 1/1997 | Wissinger | |
| 5,777,768 A | 7/1998 | Korevaar | |
| 5,838,470 A | 11/1998 | Radehaus et al. | |
| 6,008,923 A * | 12/1999 | Samdahl et al. | 398/127 |
| 6,122,084 A | 9/2000 | Britz et al. | |
| 6,239,888 B1 | 5/2001 | Willebrand | |
| 6,323,980 B1 * | 11/2001 | Bloom | 398/129 |
| 6,347,001 B1 | 2/2002 | Arnold et al. | |
| 6,462,847 B1 | 10/2002 | Willebrand | |
| 6,469,815 B1 | 10/2002 | Poon et al. | |
| 6,504,634 B1 | 1/2003 | Chan et al. | |
| 6,657,783 B1 | 12/2003 | Presby et al. | |
| 6,665,546 B1 | 12/2003 | Slaughter et al. | |
| 6,792,185 B1 | 9/2004 | Ahrens et al. | |
| 6,801,722 B1 | 10/2004 | Webb et al. | |
| 6,832,859 B1 | 12/2004 | Bell et al. | |

(Continued)

FOREIGN PATENT DOCUMENTS

WO   WO 01/05069 A2   1/2001

OTHER PUBLICATIONS

Mirriam-Webster's Collegiate Dictionary, 10th Edition; Merriam-Webster, Inc.; Copyright 2000; p. 255 and 590.*

(Continued)

*Primary Examiner*—Leslie Pascal
*Assistant Examiner*—Nathan Curs
(74) *Attorney, Agent, or Firm*—Fitch, Even, Tabin & Flannery

(57) ABSTRACT

The present invention provides a method and apparatus for free-space optical communication. The method comprises the steps of receiving a receive optical beam through a narrow field of view, determining a receive power level, shifting an alignment, maximizing the receive power, and transmitting a transmit optical beam along the alignment, wherein the narrow field of view is less than a divergence of the transmit optical beam. The narrow field of view can be a narrow region of a multi-region field of view. The apparatus comprises an optical beam transmitter configured to generate a narrow diverging transmit beam, a narrow field of view optical receiver, wherein the field of view is less than the divergence of the transmit beam, and a controller configured to determine a power level of a receive beam and to determine adjustments to a direction of transmission maximizing receive power.

16 Claims, 7 Drawing Sheets

U.S. PATENT DOCUMENTS

| | | |
|---|---|---|
| 6,956,876 B1 | 10/2005 | Aquaro et al. |
| 6,968,133 B1 | 11/2005 | Sakanaka et al. |
| 2002/0071160 A1* | 6/2002 | Pavelchek .................. 359/152 |
| 2002/0126340 A1 | 9/2002 | Nikiforov et al. |
| 2004/0141753 A1 | 7/2004 | Andreu-von Euw et al. |
| 2004/0208272 A1* | 10/2004 | Moursund et al. .......... 375/356 |

OTHER PUBLICATIONS

K. E. Wilson et al.; "Preliminary Results of the Ground-Orbiter Lasercomm Demonstration Experiment between Table Mountain and the ETS-VI Satellite", *Society of Photo-Optical Instrumentation Engineers*, vol. 2699; pp. 121-132 (1996).

Patent Cooperation Treaty, International Search Report, Feb. 10, 2005.

U.S. International Searching Authority, "International Search Report", cited in corresponding International Patent Application No. PCT/US04/00703, dated Feb. 15, 2005, 4 pages.

U.S. International Searching Authority, "Written Opinion of the International Search Report", cited in corresponding International Patetn Application No. PCT/US04/00703, dated Feb. 15, 2006, 6 pages.

* cited by examiner

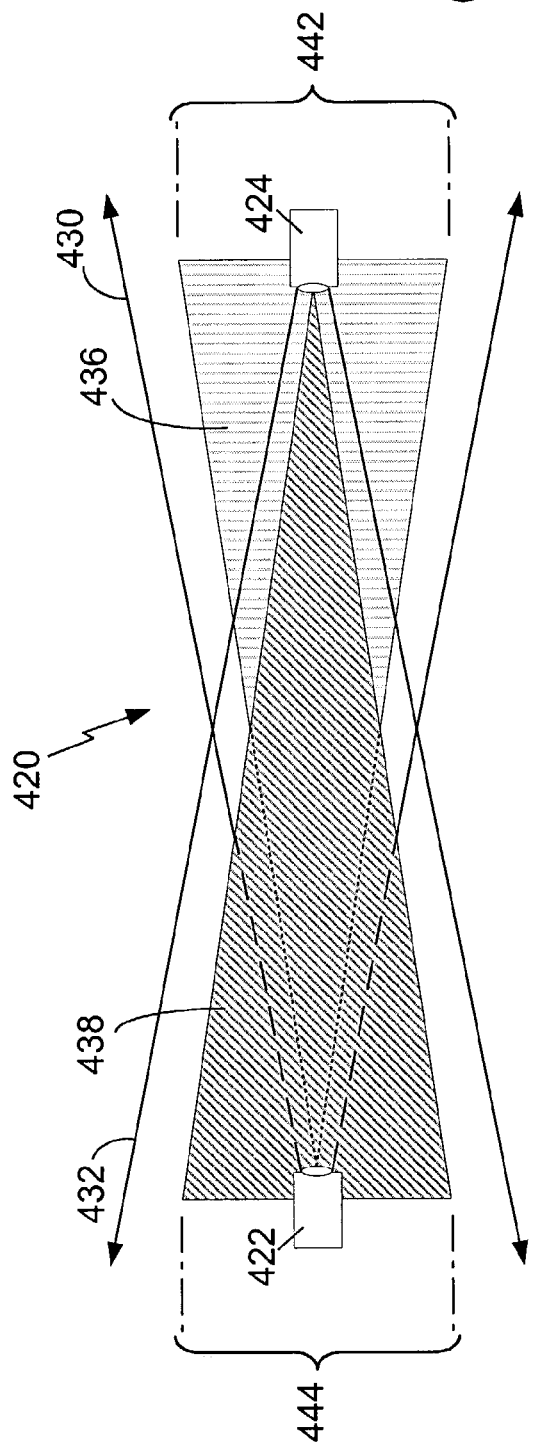
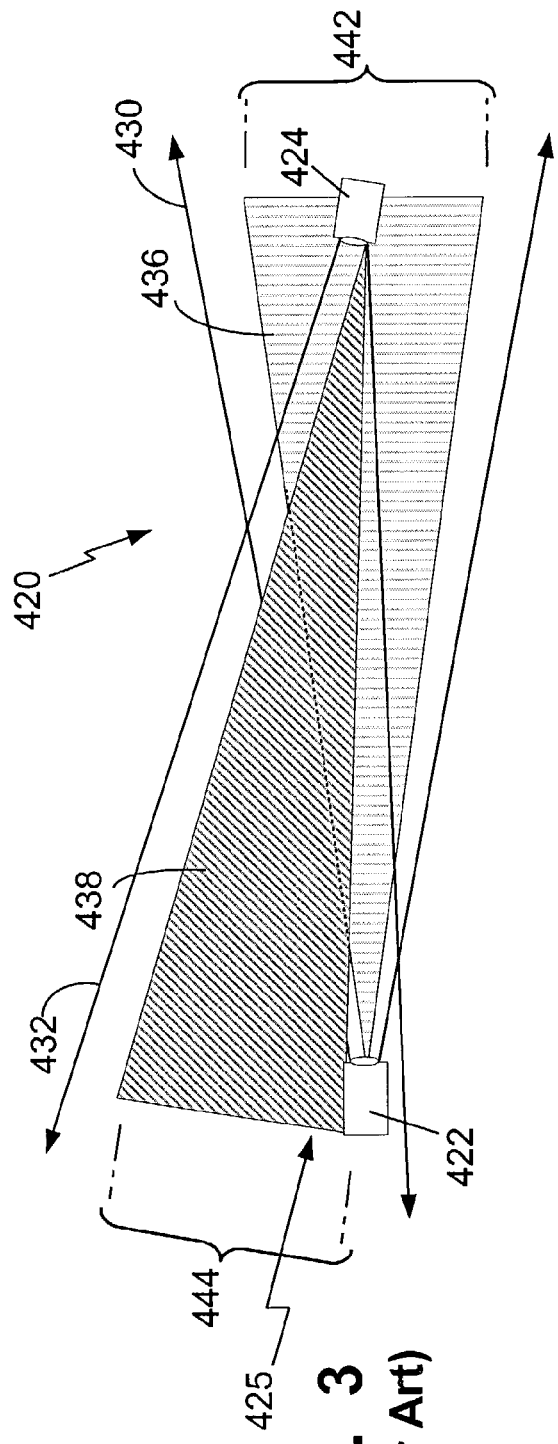
FIG. 2 (Prior Art)
FIG. 3 (Prior Art)

METHOD AND APPARATUS FOR MAINTAINING OPTICAL ALIGNMENT FOR FREE-SPACE OPTICAL COMMUNICATION

BACKGROUND OF THE INVENTION

1. Field of the Invention

The present invention relates generally to free-space optical communication, and more specifically to alignment tracking control in free-space optical networks.

2. Discussion of the Related Art

For digital data communications, optical media offers many advantages compared to wired and RF media. Large amounts of information can be encoded into optical signals, and the optical signals are not subject to many of the interference and noise problems that adversely influence wired electrical communications and RF broadcasts. Furthermore, optical techniques are theoretically capable of encoding up to three orders of magnitude more information than can be practically encoded onto wired electrical or broadcast RF communications, thus offering the advantage of carrying much more information.

Fiber optics is the most prevalent type of conductors used to carry optical signals. An enormous amount of information can be transmitted over fiber optic conductors. A major disadvantage of fiber optic conductors, however, is that they must be physically installed.

Free-space atmospheric links have also been employed to communicate information optically. A free-space link extends in a line of sight path between the optical transmitter and the optical receiver. Free-space optical links have the advantage of not requiring a physical installation of conductors. Free-space optical links also offer the advantage of higher selectivity in eliminating sources of interference, because the optical links can be focused directly between the optical transmitters and receivers, better than RF communications, which are broadcasted with far less directionality. Therefore, any adverse influences not present in this direct, line-of-sight path or link will not interfere with optical signals communicated.

Despite their advantages, the quality and power of the optical signal transmitted depends significantly on the alignment between cooperating link heads.

It is with respect to these and other background information factors relevant to the field of optical communications that the present invention has evolved.

SUMMARY OF THE INVENTION

The present invention advantageously addresses the needs above as well as other needs by providing a system and method for use in free-space optical communication. The present invention additionally provides a method and apparatus for use in maintaining optical alignment in free-space optical communication. In one embodiment, the method for use in free-space optical communication comprises the steps of receiving a receive optical beam through a narrow field of view at a first position; determining a receive power level of the receive optical beam; shifting an alignment from the first position; detecting a change in receive power level; altering the shifting of the alignment to compensate for a decrease in the receive power level; and transmitting a transmit optical beam along the alignment, wherein the narrow field of view is less than a divergence of the transmit optical beam.

In another embodiment, the invention provides a method for use in optically communicating over free-space, comprising the steps of receiving a receive optical beam through a narrow field of view at a first position; determining a first receive power level of the receive optical beam; shifting an alignment; maximizing the first receive power; and transmitting a transmit optical beam along the alignment, wherein the narrow field of view is less than a divergence of the transmit optical beam. The narrow field of view can further be a narrow region of a multi-region field of view.

In another embodiment, the invention provides an apparatus for use in providing free-space optical communication, comprising a optical beam transmitter configured to generate a narrow diverging transmit beam; a narrow field of view optical receiver, wherein the field of view is less than the divergence of the transmit beam; and a controller coupled with the optical receiver, wherein the controller is configured to determine a power level of a receive beam and further configured to determine adjustments to a direction of transmission such that a maximum receive power is detected.

In another embodiment, the invention provides a method for use in optically communicating over free-space, comprising shifting an alignment of a link head; detecting a first maximum power level; determining a first alignment positioning of the link head when the first maximum power level is detected; recording the first alignment positioning when the first maximum power level is detected; and determining a first optimal alignment based at least in part on the recorded first alignment positioning.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein:

FIG. 2 depicts a simplified block diagram of a previous free-space optical communication system;

FIG. 3 depicts a simplified block diagram of the previous free-space optical communication system of FIG. 2 where link heads have fields of view greater than a beam divergence;

Corresponding reference characters indicate corresponding components throughout the several views of the drawings.

DETAILED DESCRIPTION

The following description is not to be taken in a limiting sense, but is made merely for the purpose of describing the general principles of the invention. The scope of the invention should be determined with reference to the claims.

A free space optical network is one in which high-speed network connectivity is achieved by modulating data onto a laser optical carrier and transmitting the optical information through free space to a receiver at some distance away. Free space networks provide communication at data-rates that are comparable to fiber optics data-rates while avoiding the cost and time associated with installing fiber-optic cabling.

Figure 1:
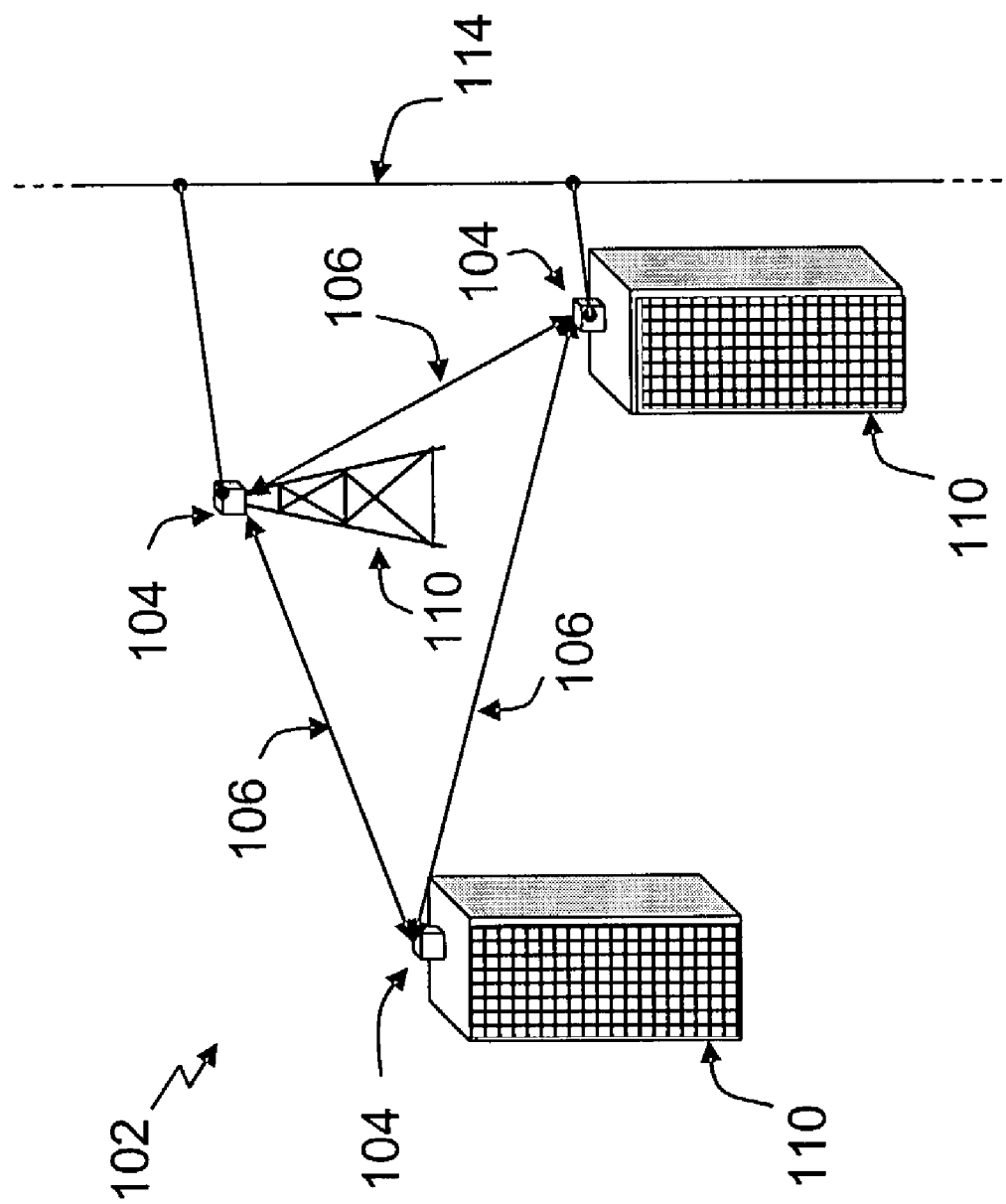
FIG. 1 depicts a free-space optical communication network according to one embodiment of the present invention.

FIG. 1 depicts a free-space optical communication network 102 according to one embodiment of the present invention. The network includes a plurality of link heads 104. Each link head comprises a transmitter, a receiver or both a transmitter and receiver (i.e., a transceiver). A link head 104 is optically aligned with at least one other link head on opposite sides of one or more free-space links 106. The link heads are mounted to structures 110, such as buildings, antennas, bridges, poles, houses and other structures. The link heads can be coupled with a network 114, such as the Internet, an inter-campus network, a Public Switched Telephone Network (PSTN), cable television, cellular backhaul or other networks capable of communicating data and/or information.

These link heads 104 are precisely aligned in order to provide free-space communication across the links 106. If the link heads become misaligned, communication between the link heads fails. Many factors can affect the alignment between link heads, including the stability of the mounting, the stability of the structure 110 (e.g., buildings can sway due to winds, seismic activity, etc.) and other such factors. Similarly, natural and man-made events can also affect the alignment. For example, wind can shift or alter the alignment of a link head, hail can impact a link head changing the alignment, interfering factors can bump, jar or move a link head causing it to shift from alignment such as birds landing on the link head, maintenance workers bumping into the link head and other similar interfering factors, and other similar events can cause misalignment. Furthermore, optical beams diverge as they travel greater distances. Divergence describes the rate at which a laser beam widens as it leaves the link head. The resulting beam divergence reduces the amount of power available for detection.

In previous free space optical networks, proposed methods and systems attempted to reduce communication errors caused by misalignment and atmospheric conditions by utilizing a beacon or tracking beam that is transmitted with a large diverge. A transmitted beacon beam diverges into a large cross-sectional profile at a receiver located some distance away from the transmitting device. In this way, small-scale deflections or misdirections are reduced as a percentage of beam width. Previous systems utilize optical receivers with a receive objective that are much smaller than the typical diverged beam width at the receiver. The large divergence reduces the amount of light received by the receiver because only a percentage, and generally a small percentage, is detected by the receiving link head. As a result, much of the received power is not detected and is thus lost. The consequence of this is wasted power, a reduction in received signal power, reduction of the signal-to-noise ratio and subsequently an introduction of undesirable errors.

FIG. 2 depicts a simplified block diagram of a previous free-space optical communication system 420. Previous free-space optical communication systems utilized link heads 422, 424 with relatively large fields of view 430, 432. Alignment between link heads is attempted to be maintained by each link head transmitting a wide diverging beacon or tracking beam 436, 438, where the tracking and/or data beams have a divergence 442, 444 that is less than the field of view 430, 432. This large field of view may not present many problems when the link heads 422, 424 have the capability to communicate directional and/or alignment information with each other to coordinate the alignment between the two. For example, if the second link head 424 shifts (e.g., up) to such a degree that the first link head 422 begins to lose the optical signal 438, the first link head communicates with the second link head to reverse or correct the adjustment. Additionally, systems that utilize link heads that do not utilize tracking and do not adjust alignment do not experience problems of coordinating alignment.

The problem results when the two link heads do not communicate to coordinate alignment. FIG. 3 depicts a simplified block diagram of the previous free-space optical communication system 420 where link heads 422, 424 have fields of view greater than a beam divergence. If the second link head 424 adjusts its alignment, it may shift to a point where the transmit beam 438 is no longer being received by first link head 422, or the first link head is receiving only the fringes of the transmit signal where the received power level at the first link head is insufficient for accurate detection (indicated generally as 425). Because the first link head cannot communicate the loss of the signal 438 or significant reduction in the received signal, the second link head is unaware that its movement caused any problems with the first link head. That is because the first link head beam 436 is still directed at the second link head and still within the second link head's wide field of view 432. As such, with previous systems, a transition at one link head may adversely affect the optical alignment without the transitioning link head knowing that its transition is adversely affecting the alignment.

The present invention provides a free-space optical communication apparatus, system, network and method that optimize alignment between two or more link heads. Further, the present invention optimizes alignment between two or more link heads when the link heads cannot communicate alignment, positioning and adjustment information between the link heads.

The present invention provides for tracking and power level control of transmitted and received beams to maintain alignment between link heads and to overcome the disadvantages and drawbacks of previous free-space communication networks, including compensating for beam misdirection, misalignment and power loss. By controlling beam direction, pointing and alignment to accurately impinge on a receiver, a beam diameter can be significantly narrowed, and the beam divergence reduced. This allows the beam cross-sectional size at the receiver to be much more closely matched to the optical receiver, leading to a greater transfer of the available power into the receiver. The present invention further employs signal tracking control that further leads to a greater signal-to-noise ratio and reduces or eliminates undesirable errors. Due to the tracking capabilities, the present invention allows for mounting of link heads in positions and on structures where systems without tracking could not function.

In one embodiment, each link head operates independent of the other. Each link head monitors the power level of a received signal. Based on the signal power level, a link head attempts to optimize alignment by adjusting its positioning and/or alignment to maximize the received power.

Figure 4:
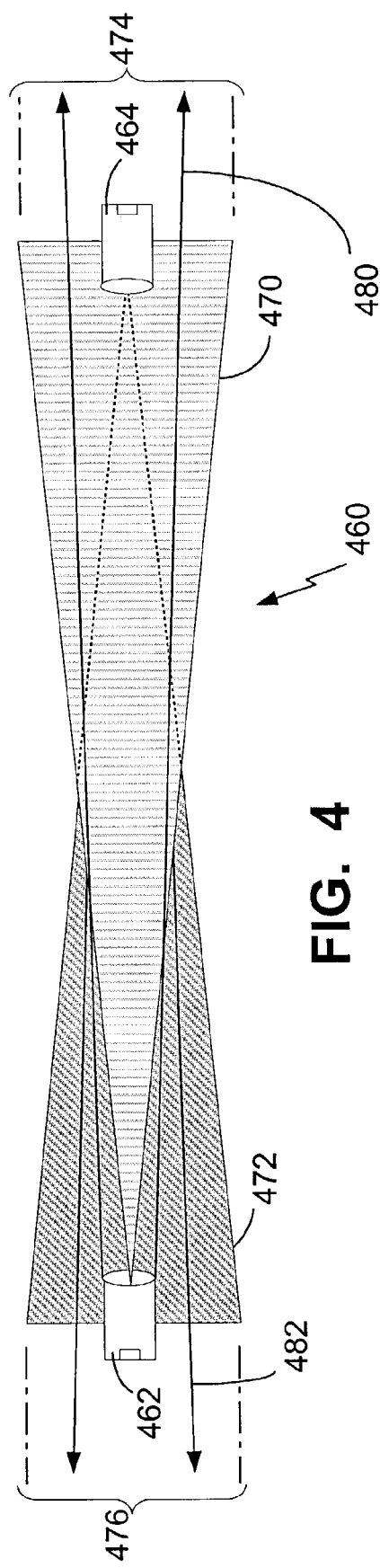
FIG. 4 depicts a simplified block diagram of a free-space optical communication link according to one embodiment of the present invention.

FIG. 4 depicts a simplified block diagram of a free-space optical communication link 460 according to one embodiment of the present invention. The link is established between at least two link heads 462, 464 that are optically aligned such that transmitted beams 470 and 472 impinge squarely on the opposing link heads 464 and 462, respectively. Further, each link head has the other within its field of view 480, 482. In one embodiment, the transmit beams are transmitted such that the divergence 474, 476 is relatively narrow compared with previous free-space systems. Typically, the system 460 is configured such that the link heads do not communicate alignment and/or directional information between the link heads. As such, each link head independently determines an optimal alignment. This significantly reduces the complexity of the link head as well as the cost of the link head. However, the link heads can be configured to include the capability to communicate alignment information.

The present invention utilizes a narrow receive field of view 480 and 482. Preferably, the receive field of view of the present invention is not larger than the transmit beam divergence 474, 476, and more preferably, the receive field of view is less than the transmit beam divergence. This further simplifies the link heads 462, 464, allows the size and weight of the link heads to be reduced and significantly reduces the cost of the link heads. The reduced size and/or weight additionally allow the link heads of the present invention to be mounted in and on structures 110 (see FIG. 1) where previous link heads could not be mounted due to stability or aesthetics.

Figure 5:
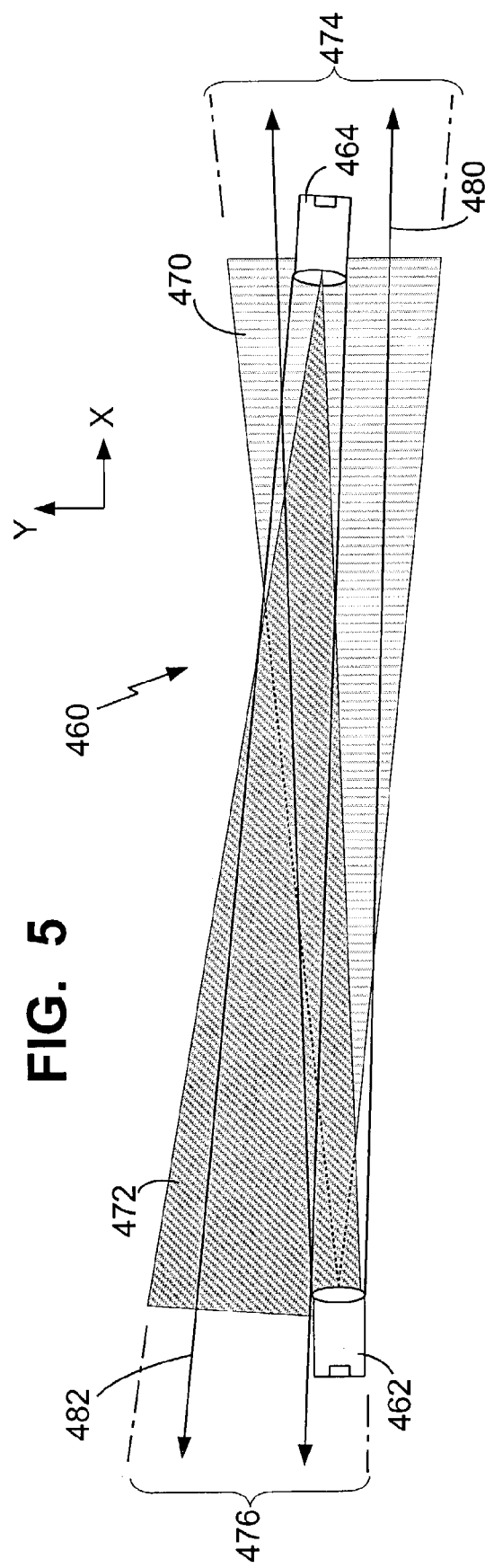
FIG. 5 depicts a simplified block diagram of the free-space optical communication link, similar to that shown in FIG. 4, where the alignment of the second link has shifted.

FIG. 5 depicts a simplified block diagram of the free-space optical communication link 460, similar to that shown in FIG. 4, where the alignment of the second link 464 has shifted (e.g., shifted in a Y direction). This shift has not significantly affected the first link head's ability to receive the second link head beam 472 because the beam 472 is still within the first link head's field of view 480. However, further adjustments by the second link head in the same Y direction would shortly begin to adversely affect the first link head receive power.

Because the second link head 464 has a field of view 482 that is narrower than the divergence 476 of the transmit beam 472, the optical power detected by the second link head of the first link head beam 470 already has begun to decrease. This decrease begins to occur before the first link head 462 detects a change to the receive power of the second link head beam 472. As the second link head adjusts in the same Y direction the second link head field of view 482 transitions out of alignment with the first link head transmit beam 470. As the field of view transitions out of alignment the second link head begins to limit its ability to detect the first link head transmit beam 470 and as a result the second link head's received power begins to decrease. The second link head detects the decrease in the received optical power and halts the adjustments in the same Y direction, and begins to reverse or make other adjustments in an attempt to optimize the received power. As such, the second link head is able to independently maintain alignment with the first link head without having to communicate alignment information between the link heads.

In one embodiment, the present invention utilizes an aggregate of multiple fields of view, or a multi-region or tapered field of view to optimize the detection of beams and the alignment between link heads. For example, two fields of view can be aggregated to establish a final or total field of view. As another example, the multi-region field of view can be configured such that there is a relatively narrow field of view for maximum detection of the received beam and additionally have a wide field of view for low power detection.

Figure 6:
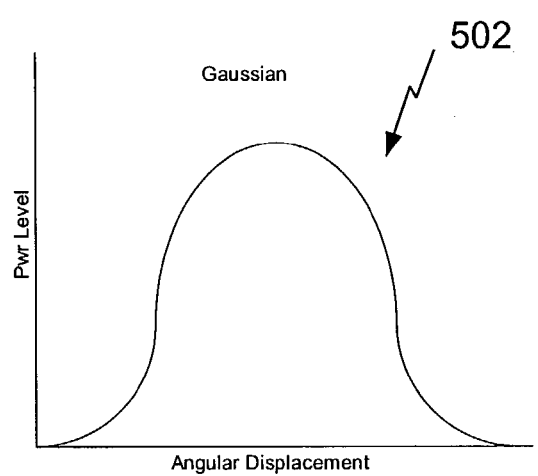
FIG. 6 depicts a graph showing a Gaussian profile distribution.
Figure 7:
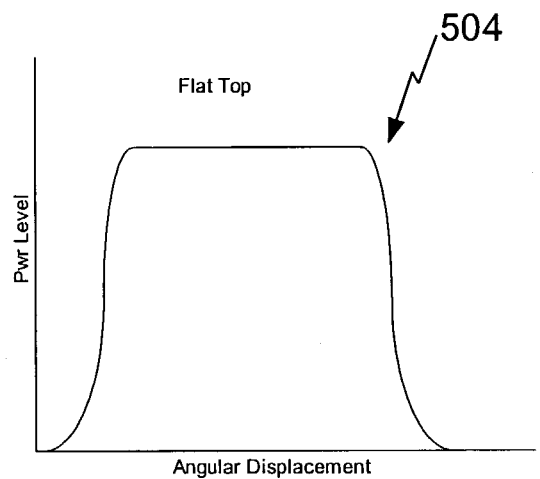
FIG. 7 depicts a graph showing a flat-top profile distribution.

The field of view of previous optical systems are typically implemented somewhere between a Gaussian profile and a flat-top profile. FIG. 6 depicts a graph showing a Gaussian profile distribution 502. FIG. 7 depicts a graph showing a flat-top profile distribution 504.

Figure 8:
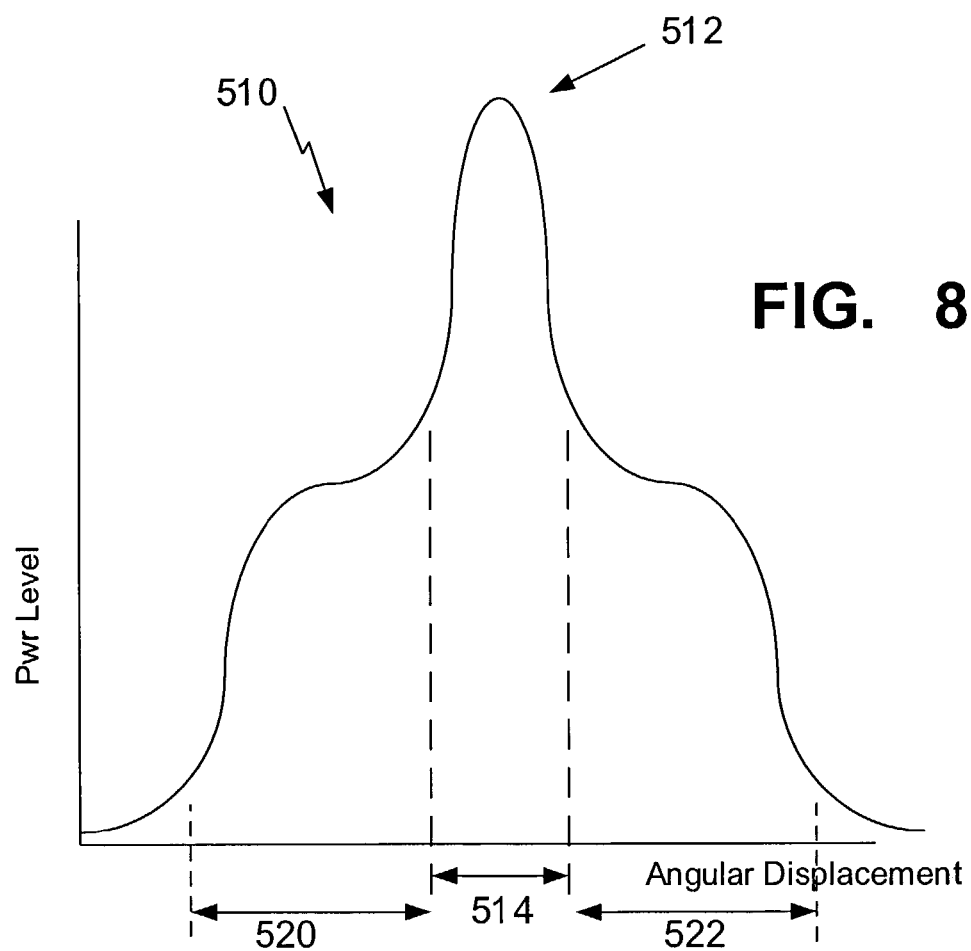
FIG. 8 depicts a profile distribution of the multi-region field of view for a link head according to one embodiment of the present invention.

FIG. 8 depicts a profile distribution 510 of the multi-region field of view for a link head according to one embodiment of the present invention. The field of view is tailored to include a peak 512 in a central region 514. The peak provides for a large measure of receive power utilized to optimize alignment in achieving a maximum power. On either side of the peak region 514 are low detection regions 520, 522. This multi-region field of view distribution provides the best of both worlds, the narrow center peak allows the benefits of a narrow field of view to optimize alignment and detect shifts away from optimal alignment, while the wide low detection region 520, 522 simplifies and improves tracker to allow for easier recover from large pointing or misalignment errors. The tailored field of view provides feedback for the alignment and/or pointing control system of the present invention. The multi-region field of view 510 is one example of a multi-level field of view that can be implement; however, other multi-region fields of view can be utilized in the present invention as well as a single level field of view.

Figure 9:
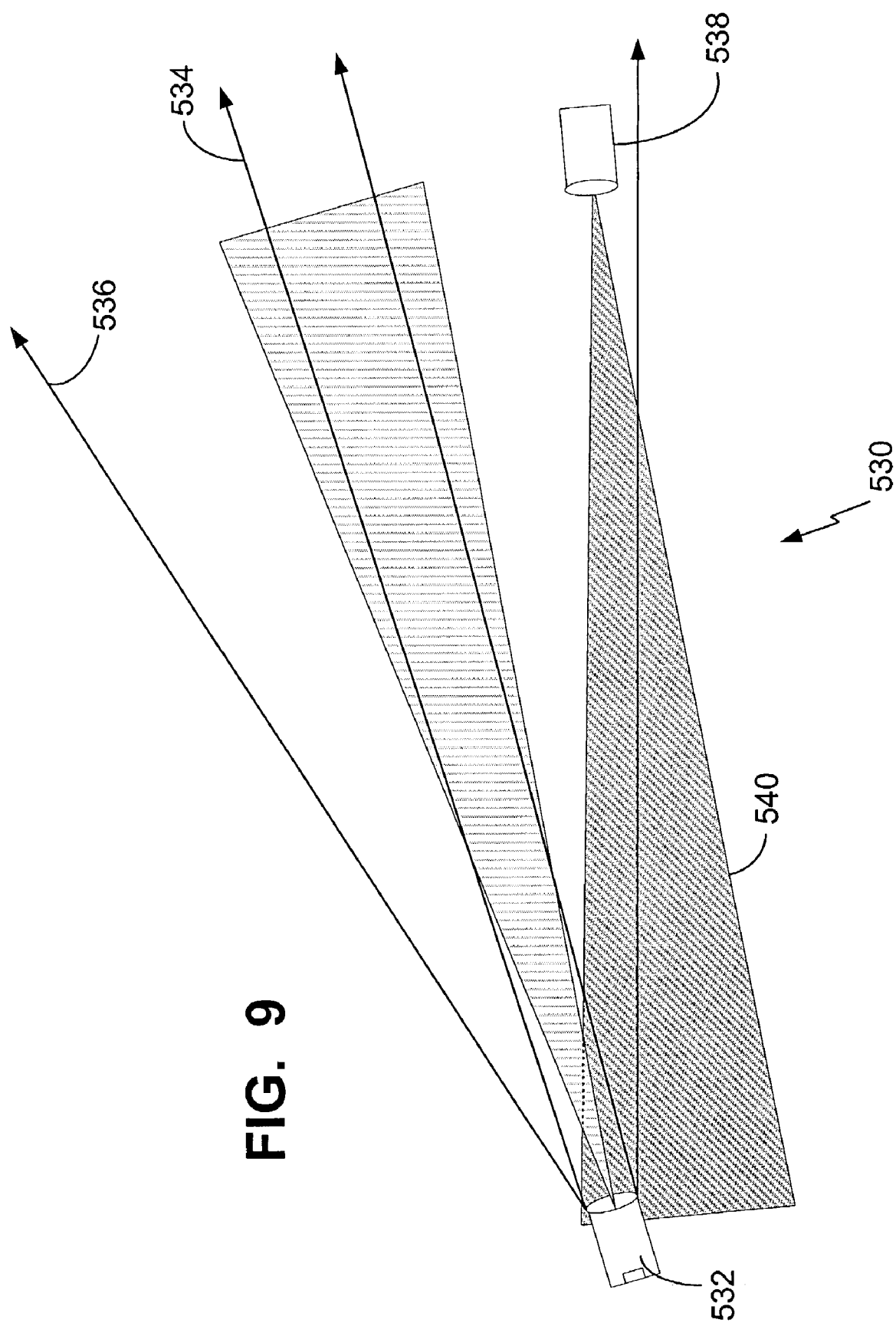
FIG. 9 depicts a simplified block diagram of a link 530 according to one embodiment of the present invention.

FIG. 9 depicts a simplified block diagram of a link 530 according to one embodiment of the present invention. A first free-space link head or optical transceiver 532 includes a multi-level or multi-region field of view with a narrow field of view 534 for maximum power detection and a wide field of view 536 for low power beam detection. A second link head 538 transmits a narrow diverging beam 540. The first link head 532 is shown out of alignment with the second link head 538. As such, the beam 540 is not within the first link head's narrow field of view 534. However, the beam is still within the first link head's wide field of view 536. Therefore, the first link head can detect the beam through the low power wide field of view 536 and determine an angle of alignment. The first link head can then make the adjustments to shift the first link head such that the beam is within the narrow field of view 534 and to maximize the receive power.

In one embodiment of the present invention, one or more of the link heads is configured to implement a shifting or dithering tracking function or algorithm. In this function one or more of the link heads periodically dithers or shifts its position in order to maximize the received optical power level. Upon shifting, if the received power increases, the link head maintains the new position. If the received power decreases, the link head returns to the previous, higher power position, or shifts slightly in an alternate direction.

In implementing this function one link heads dithering could, by dithering the amount of light that hits the far field link head, confuse the far field link head as the far field link head searches for the optimum power level. As such, in one embodiment, the link heads are configured such that the dither function(s) is not implemented at regular intervals. The dithering function interval can be implemented randomly. This ensures that the link heads do not follow each other. If the link heads confuse each other on one dithering run it is unlikely that they will confuse each other in the following pass.

In one embodiment, the dithering function is scheduled. Each link head of a link 460 can be scheduled to dither at different times. For example, the first link head can be scheduled to implement the dither function at the top of the hour and at the half hour, while a second link head is scheduled to implement the dither function at fifteen and forty-five minutes after the hour. As other examples, the first link head can be scheduled to dither on every even minute, while a second link head is scheduled to dither on every odd minute; the first link head can be scheduled to dither every four minutes and the second link head can be scheduled to dither every five minutes; or other similar scheduling.

As described above, in order to minimize the effect of near field dithering on the far field link head, the field of view is set to be narrower than the divergence. Having the field of view narrower than the divergence minimizes the effects of near field dithering as illustrated in FIGS. 4 and 5. As the second link head 464 dithers slightly the second link head beam 472 is still within the first link head field of view 480 so the first link head 462 is not, or very minimally, affected. However, as the second link head field of view 482 shifts with the link head shift, the second link head field of view 482 has already become misaligned with the first link head beam 470 as the first link head beam 470 starts to leave the second link head field of view 482. As a result, received power level at the second link head decreases and is detected by the second link head 464. When the second link head shifts away from optimal alignment the second link head detects a decline in the received power level without affecting or only minimally decreasing the first link head received power level. The second link head can then implement corrective shifts back to a position with higher receive power or make other shifts in attempts to maximize the received power.

Figure 10:
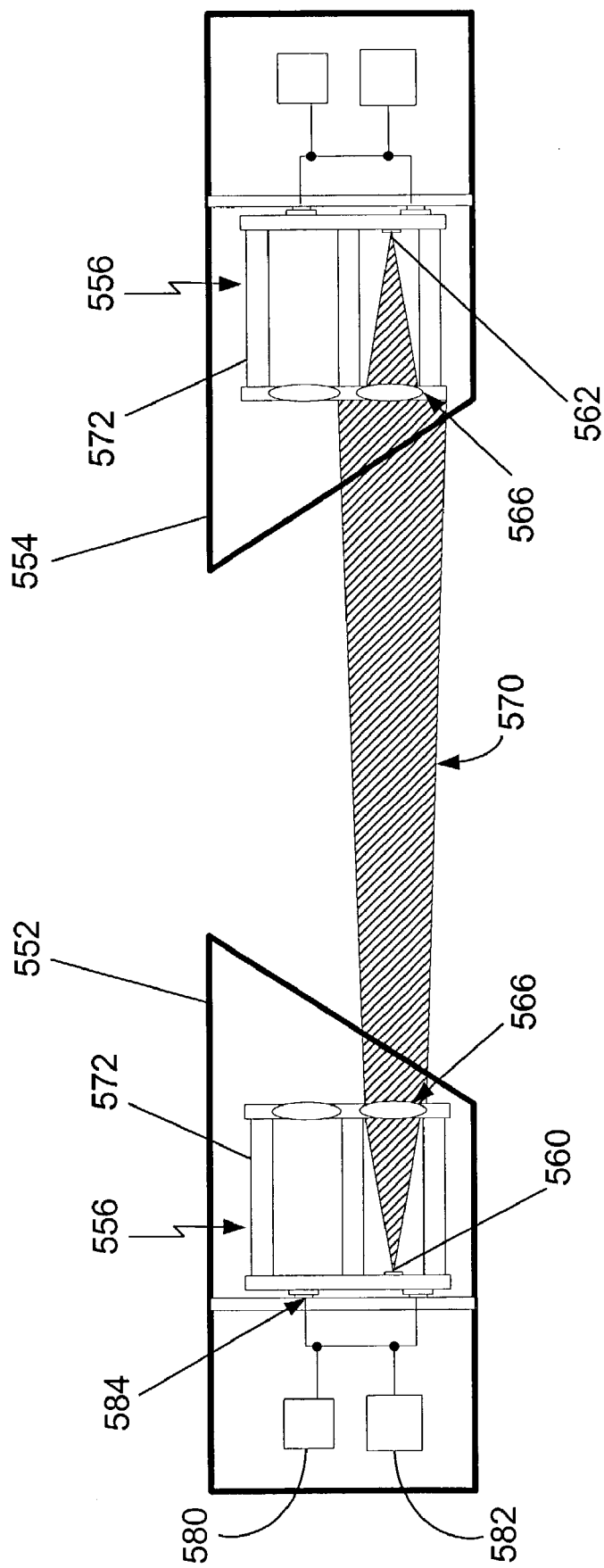
FIG. 10 depicts a simplified block diagram of a cross-sectional view of a pair of link heads communicating over a free-space link according to one embodiment of the present invention.

FIG. 10 depicts a simplified block diagram of a cross-sectional view of a pair of link heads 552, 554 communicating over a free-space link 550 according to one embodiment of the present invention. The each link head includes optical components 556 that can include optical signal generators 560 (e.g., lasers, LEDs and the like) and optical signal detectors 562 (e.g., one or more photodiodes, quad-cell(s), CCDs, and the like). Typically, each link head 552, 554 includes one or more optical signal generators 560 and one or more optical signal detectors 562. The optical components can further include lenses, gradients, telescope assemblies, filters and other optics 566, which can provide focusing, filtering, polarizing and other such conditioning of the transmit and/or receive optical signals 570.

In one embodiment, the link heads include an optical assembly, gimbal or optics cage 572, wherein the optics, lasers and/or detectors are secured. The optical assembly is configured to move to achieve alignment. The optical assembly 572 can adjust the pointing of the link head adjusting both the azimuth and elevation to adjust the positioning and/or alignment of the optical components 556. The link heads can further include electronics 580 and a controller 582. The controller can be implemented through substantially any controller including, but not limited to, a microprocessor, a CPU and/or substantially any other controller. The controller can include and/or access a memory for storing and retrieving information, such as power levels, statistical information, control procedures, look-up tables and other data and information. Because the optical assembly 572 is configured to move to achieve alignment the link head framing, structure, electronics, controller and other components of the link head are static or in a fixed position. In one embodiment, the optical assembly 572 and optical components 556 are moved by one or more linear motors 584.

In one embodiment, the controller 582 controls the operation of the motors and the movement of the optical assembly 572 and monitors the received optical power. The controller directs the one or more motors 584 to adjust the optical assembly 572 and/or optical components 556 according to the magnitude of the received optical power to maximize the received power. Typically, the link heads do not include additional sensors, such as positioning sensors. This further reduces the complexity and cost of the link heads. Alternatively, the alignment and/or positioning of the optical components 556 is dictated by the level of the received power and adjusted to maximize the received power. However, the link head can be configured with additional sensors, such as a positioning sensor to monitor the positioning of the optical assembly 572 and to provide the positioning information to the controller.

In one embodiment, if a first link head become so misaligned that it can no longer detect an optical signal from a cooperating second link head, then the first link head can enter a search mode to initiate one or more search patterns to locate the second link head. The optical assembly 572 and motor(s) 584 implement the search pattern(s). One example of a search pattern is a spiral from a center point out or spiral in towards the center point. Alternatively and/or additionally, the search pattern can be a horizontal and/or vertical serpentine pattern. Other similar search patterns can also be employed.

In one embodiment, if the first link head detects the lost of communication with the second link head, the first link head waits a predefined period of time before initiating the search patterns. This ensures that the communication across the link is not simply temporarily down, for example because of a power glitch, something temporarily blocking the beams (e.g., a bird flying through the beam) or other similar condition that can temporarily inhibit the beam.

Figure 11:
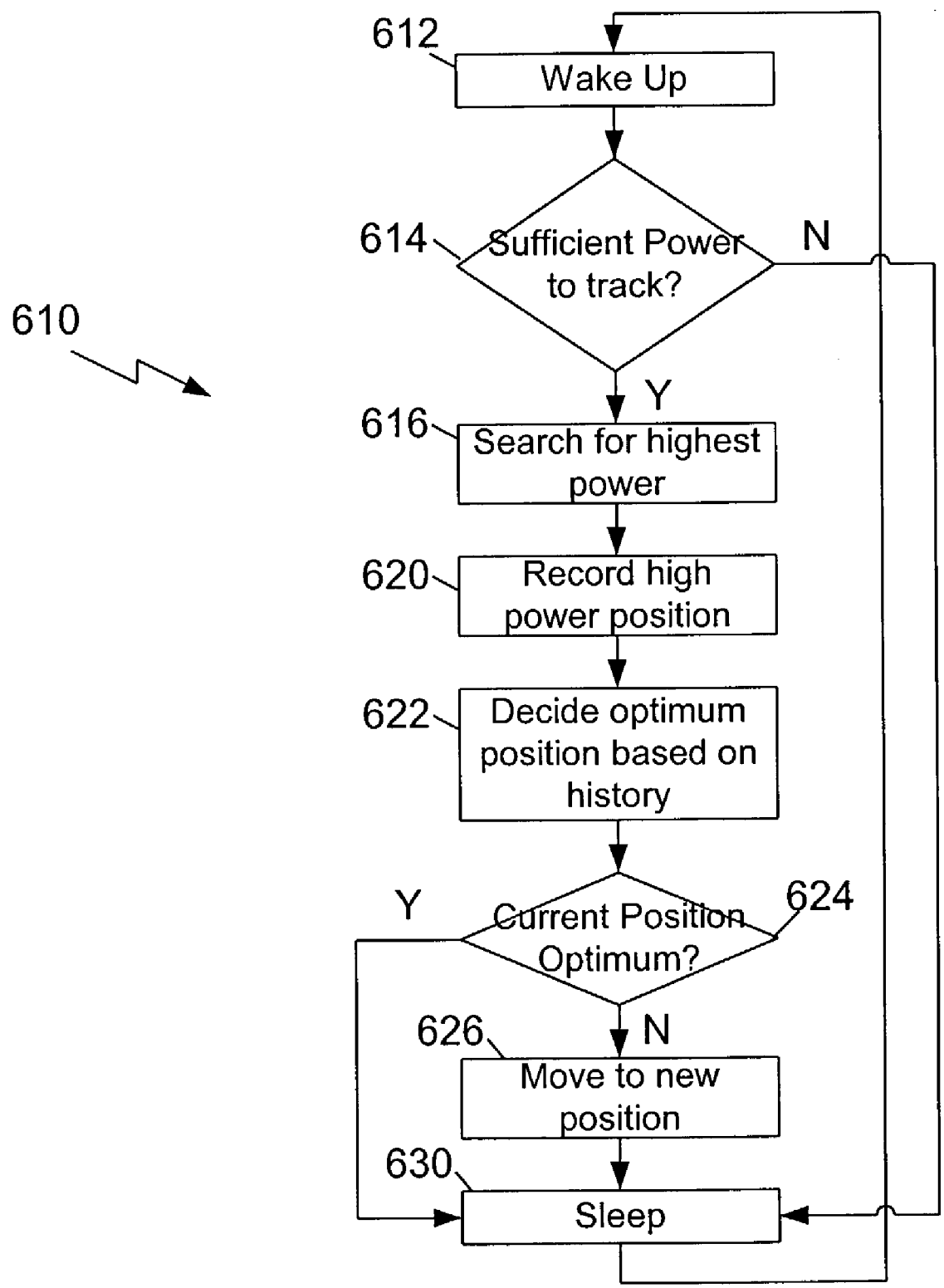
FIG. 11 depicts a simplified flow diagram of a process for maintaining optical alignment over a free-space link.

FIG. 11 depicts a simplified flow diagram of a process 610 for maintaining optical alignment over a free-space link according to one embodiment of the present invention. The process 610 of FIG. 11 shows one cycle of a possible loop or flow for performing tracking and maintaining alignment. In step 612 the process transitions to a wake or active tracking mode from a dormant or inactive tracking mode. In step 614 it is determined if sufficient power is being received to implement tracking. If there is insufficient power to track the process proceeds to step 630 returning to a dormant mode awaiting wake up in the next cycle. If in step 614 it is determined that there is sufficient power to track, the system proceeds to step 616 and performs a localized search to see if the power can be improved. Typically, the localized search is limited to a small area. During the search, the positioning of the link head and the received power levels are monitored.

In step 620 the position(s) with the highest power levels are recorded. In step 622 the process compares the position(s) with the highest power recorded in step 620 with the positions recorded in previous iterations of the process 610 and determines a position for the link head to optimize the communication link.

In steps 624 it is determined if the current position of the link head is at the optimum position as determined in step

622. If the link head is not in the optimum position, the process transitions to step 626 where the link head moves to the new desired position. Following step 626, and if it is determined in step 624 that the link head is in the correct position, the process proceeds to step 630. In step 630 the process returns to the dormant or inactive mode. Following step 630, the process returns to step 612 to again optimize alignment. Typically, the process waits a period of time (a set period or a random period) following step 630 before initiating step 612.

In one embodiment, when severe misalignment occurs, only one link head (e.g., first link head 460) implements the search pattern while the other (e.g., the second link head 462) returns to a predefined set position. In one embodiment, the second link head remains in the predefined set position for a first predefined period of time. If the second link head does not detect the beam 470 of the first link head within a second predefined period of time, the second link head then initiates a search pattern. The first link head can be configured to continue searching after the second predefined period or can be configured to halt the search and return to a predefined set position.

In one embodiment, the controller maintains statistics on the direction of transmission. As the link head shifts positioning it maintains the number of times the link head is in that position or within a range of positions (e.g., ±0.1). The controller then utilizes the statistics in implementing the search mode. For example, the controller can initiate the search mode to transition between the five positions most often implemented, equating to the positions with the five historically highest receive powers. The search can transition between these five positions for a first predefined period. If the link head does not acquire the cooperating link head within the first predefined period of time, the controller can direct the search to transition between the ten positions most often implemented for a second predefined period. This search mode can continue for any number of iterations. If the cooperating link head is not acquired after a fixed period of time or fixed number of iterations, the link head can then transition to a spiral, serpentine or other search pattern.

In one embodiment, the present invention can utilize a field of view that has a width that is approximately the same width as the beam divergence. The field of view can be slightly larger than the divergence (e.g., +ΔX), equal to the beam divergence or slightly smaller than the beam divergence (e.g., −ΔX). The present tracking method and system can utilize the dithering to compensate for the field of view having a width similar to the beam divergence. In practice, as one link head of a pair of link heads shifts and experiences a change in received power, the other link head may also detect a change in received power. As such, to further ensure desirable receive power levels one or both of the link heads of a link can maintain a database associating power levels with directions of alignment for the link head.

In operation, communicating link heads of a link are generally immobile for most of the time. Periodically one or both of the link heads are configured to dither or shift positioning. This dithering can occur on schedule or at random intervals. During the dithering the link head monitors the received power levels as it shifts alignment. The link head records the receive power level and the alignment positioning of the link when receiving a maximum receive power, or the link head records a plurality of the alignment positions associated with the N greatest receive power levels. For example, during the dithering the link head can record five alignment positions associated with the five greatest receive power levels detected during the dithering.

One or both link heads typically maintain a database of these alignment positions as well as alignment positions or pluralities of alignment positions for several previous dither occurrences. For example, the link head can record the positions and power levels for the last 10 dither events, the last 15 dither events or substantially any other number to achieve the desired alignment. The database of alignment positions is then referenced to determine the alignment positioning that should be implemented by the link head to optimize receive power. In maintaining the database to include the alignment positions and receive power levels associated with those positions for a plurality of dithering events, the present invention compensates for the chance occurrence that both link heads of a free space link are dithering at the same time. Because the link heads are scheduled to dither randomly, or are scheduled at predefined times, it is unlikely that the two link heads would dither at the same time more than once within a reasonable period of time. As such, the database of recorded alignment positions and power levels allow the link head to accurately determine an optimal alignment without communicating with the far field link head even when the field of view is equal to, slightly larger than or slightly less than the beam divergence.

While the invention herein disclosed has been described by means of specific embodiments and applications thereof, numerous modifications and variations could be made thereto by those skilled in the art without departing from the scope of the invention set forth in the claims.

What is claimed is:

1. A method for use in free-space optical communication, comprising the steps of:
   receiving a receive optical beam through a narrow field of view at a first position of a first link head;
   determining a receive power level of the receive optical beam;
   shifting an alignment from the first position;
   detecting a change in receive power level;
   altering the shifting of the alignment to compensate for a decrease in the receive power level; and
   transmitting a transmit optical beam along the alignment to a second link head, wherein the narrow field of view is less than a divergence of the transmit optical beam;
   wherein both the first and second link heads are capable of shifting alignment to compensate for a decrease in receive power levels at a same time and without having to communicate alignment information between them;
   wherein the steps of at least shifting, detecting, and altering the shifting are performed such that the transmit optical beam does not leave a far field transceiver field of view.

2. The method as claimed in claim 1, wherein the step of shifting includes dithering the alignment at either random intervals or at scheduled different times than dithering of the second link head.

3. The method as claimed in claim 1, wherein the steps of at least shifting, detecting, and altering the shifting are performed without significantly adversely affecting a far field receive power level.

4. A method for use in optically communicating over free-space, comprising the steps of:
   receiving a receive optical beam through a narrow field of view at a first position of a first link head;
   determining a receive power level of the receive optical beam;
   shifting an alignment;
   maximizing the receive power; and transmitting a transmit optical beam along the alignment to a second link head, wherein the narrow field of view is less than a divergence of the transmit optical beam;

wherein both the first and second link heads are capable of shifting alignment to maximize receive power levels at a same time and without having to communicate alignment information between them;

wherein the narrow field of view is a narrow region of a multi-region field of view.

5. The method as claimed in claim 4, wherein the step of determining the receive power includes determining a first receive power level of the received optical beam and the step of shifting includes shifting the alignment to a second position, and further comprising the steps of:

determining a second receive power level of the receive optical beam;

determining which of the first and second receive power levels is greater;

maintaining the second positioning if the second receive power level is greater than the first receive power level; and shifting to the first position if the first receive power level is greater than the second receive power level.

6. The method as claimed in claim 4, further comprising the step of:

dithering the alignment at either random intervals or at scheduled different times than dithering of the second link head; and determining the maximum receive power level during the dithering.

7. The method as claimed in claim 4, further comprising the step of:

searching through a search pattern for the receive optical beam.

8. A method for use in optically communicating over free-space, comprising the steps of:

receiving a receive optical beam through a narrow field of view at a first position of a first link head;

determining a receive power level of the receive optical beam;

shifting an alignment;

maximizing the receive power; and transmitting a transmit optical beam along the alignment to a second link head, wherein the narrow field of view is less than a divergence of the transmit optical beam;

wherein both the first and second link heads are capable of shifting alignment to maximize receive power levels at a same time and without having to communicate alignment information between them;

further comprising the steps of:

searching through a search pattern for the receive optical beam; and detecting the receive optical beam in the search pattern through a wide region of a multi-region field of view.

9. The method as claimed in claim 4, wherein the receive optical beam is a data beam.

10. The method as claimed in claim 4, wherein the steps of receiving, determining, shifting and transmitting are performed without communicating alignment information with a far field transceiver.

11. An apparatus for use in providing free-space optical communication, comprising:

a optical beam transmitter configured to generate a narrow diverging transmit beam;

an optical receiver having a narrow field of view, wherein the narrow field of view is less than the divergence of the transmit beam; and a controller coupled with the optical receiver, wherein the controller is configured to determine a power level of a receive beam and further configured to determine adjustments to a direction of transmission such that a maximum receive power is detected;

wherein the optical receiver and optical beam transmitter are included in a first link head that is movable such that the optical receiver and optical beam transmitter are moved to maximize the receive power from a second link head;

wherein both the first and second link heads are capable of moving to maximize receive power levels at a same time and without having to communicate alignment information between them;

wherein the optical receiver is further configured with a multi-region field of view.

12. The apparatus as claimed in claim 11, wherein the optical receiver and optical beam transmitter are moved without significantly adversely affecting a far field receive power.

13. The apparatus as claimed in claim 11, further comprising:

an optical assembly in which the optical receiver and optical beam transmitter are positioned, and the optical assembly is configured to move such that the receive power is maximized.

14. The apparatus as claimed in claim 11, wherein the controller is configured to implement adjustments to the direction of transmission such that a maximum receive power is detected without significantly adversely affecting a far field receive power.

15. The apparatus as claimed in claim 11, wherein the second link head comprises a far field optical transceiver comprising:

a far field optical beam transmitter configured to generate a narrow diverging far field transmit beam;

a narrow field of view far field optical receiver, wherein the far field of view is less than the divergence of the far field transmit beam; and a far field controller coupled with the far field optical receiver, wherein the far field controller is configured to determine a far field power level of a far field receive beam and further configured to determine far field adjustments to a far field direction of transmission such that a maximum far field receive power is detected.

16. The apparatus as claimed in claim 11, wherein the field of view includes a central region with an optimal receive efficiency and an outer region of the field of view with low power detection of a receive optical beam.

* * * * *